United States Patent
Kimball et al.

(10) Patent No.: US 10,853,060 B2
(45) Date of Patent: Dec. 1, 2020

(54) SOFTWARE REFACTORING SYSTEMS AND METHODS

(71) Applicant: Architecture Technology Corporation, Minneapolis, MN (US)

(72) Inventors: Colleen Kimball, Ithaca, NY (US); Katey Huddleston, Ithaca, NY (US); Paul Nicotera, Ithaca, NY (US)

(73) Assignee: ARCHITECTURE TECHNOLOGY CORPORATION, Minneapolis, MN (US)

( * ) Notice: Subject to any disclaimer, the term of this patent is extended or adjusted under 35 U.S.C. 154(b) by 0 days.

(21) Appl. No.: 16/740,619

(22) Filed: Jan. 13, 2020

(65) Prior Publication Data

US 2020/0150951 A1 May 14, 2020

Related U.S. Application Data

(63) Continuation of application No. 15/926,912, filed on Mar. 20, 2018, now Pat. No. 10,534,604.

(51) Int. Cl.
*G06F 9/44* (2018.01)
*G06F 8/72* (2018.01)
*G06F 8/41* (2018.01)

(52) U.S. Cl.
CPC ............... *G06F 8/72* (2013.01); *G06F 8/427* (2013.01); *G06F 8/443* (2013.01)

(58) Field of Classification Search
None
See application file for complete search history.

(56) References Cited

U.S. PATENT DOCUMENTS

| 9,223,554 | B1* | 12/2015 | Lawson | G06F 8/54 |
| 10,534,604 | B1 | 1/2020 | Kimball et al. | |
| 2008/0022266 | A1 | 1/2008 | Hudson | |
| 2011/0231828 | A1* | 9/2011 | Kaulgud | G06F 8/77 |
| | | | | 717/131 |
| 2014/0282456 | A1* | 9/2014 | Drost | G06F 8/76 |
| | | | | 717/158 |

(Continued)

OTHER PUBLICATIONS

Keller, "Navy Picks Nine Companies to Write and Maintain Software for Important Battle-Management Systems," militaryaerospace.com, Mar. 6, 2015, 4 pp.

(Continued)

*Primary Examiner* — Qamrun Nahar
(74) *Attorney, Agent, or Firm* — Shumaker & Sieffert, P.A.

(57) ABSTRACT

A computer-implemented method includes creating, by a computing device, an abstract syntax tree based on a source code file of a software application, the source code file including source code defining operations of the software application. The method also includes traversing, by the computing device, the abstract syntax tree. The method further includes identifying, by the computing device and based on the traversing of the abstract syntax tree, one or more code violations present in the source code. The method also includes generating, by the computing device, at least one refactoring option for the one or more code violations, each refactoring option of the at least one refactoring option representing a change to the source code file that is configured to remediate the associated code violation.

19 Claims, 8 Drawing Sheets

(56) References Cited

U.S. PATENT DOCUMENTS

2015/0082276 A1* 3/2015 Balachandran ........... G06F 8/42
717/112

OTHER PUBLICATIONS

Hoffman, "Air Force Awards Leidos $350M Joint Mission Planning System Integration IDIQ," govconwire.com, Dec. 9, 2016, 1 pp.
"IT Glossary (/it-glassary/)," retrieved from https://www.gartner.com/it-glossary/legacy-application-or-system/ on Dec. 1, 2017, 2018, 2 pp.
Anderson, "Embedded Medical Device Software—How and Why to Use Static Analysis to Update Legacy Code," Embedded Systems Engineering, Jan. 14, 2015, 4 pp.
Vecchio et al., "Digital Demand in the Banking Industry and the Impact on Legacy Systems," gartner.com, Jun. 15, 2016, 1 pp.
Zhang et al., "Migrating Legacy Applications to the Service Cloud," Conference Paper, OOPSLA 2009, Oct. 2009, pp. 59-67.
Fratini et al., A Service Oriented Approach for the Interoperability of Space Mission Planning Systems, 4th Workshop on Knowledge Engineering for Planning and Scheduling, KEPS-2013, Jun. 2013, 5 pp.
Lecun et al., "How do you Teach a Machine?," The Wall Street Journal, Jun. 14, 2016, 5 pp.
Murphy-Hill, "The Past, Present, and Future of Refactoring," computers.org, Dec. 2015, 3 pp.
Fowler, "Workflows of Refactoring," martinfowler.com, Jan. 8, 2014, 14 pp.
Prosecution history from U.S. Appl. No. 15/926,912, dated Mar. 20, 2018, through Nov. 22, 2019, 77 pp.

* cited by examiner

SOFTWARE REFACTORING SYSTEMS AND METHODS

This application is a continuation of U.S. patent application Ser. No. 15/926,912, filed Mar. 20, 2018, the entire content of which is incorporated by reference.

STATEMENT REGARDING FEDERALLY SPONSORED RESEARCH OR DEVELOPMENT

This invention was made with Government support under Contract N68334-17-C-0416 with the United States Navy. The U.S. Government has certain rights in this invention.

TECHNICAL FIELD

The disclosure relates to methods and devices for software refactoring.

BACKGROUND

During the software development lifecycle, application developers may experience time pressures, architectural crossroads, or other programming-related issues during development of a particular application. In some instances, application code may be developed hastily, or without significant attention to certain coding standards or best practices. Such situations may cause developers to introduce imperfections in the application's source code. "Code smells" refer to aspects of an application's code or structure that violate certain design principles or otherwise negatively impact aspects of the application's design. While some code smells may not be considered "bugs" in the software (e.g., the particular code segment operates as intended), the violation of software design principles or coding best practices may cause some software developers to wish to alter application source code to remove such code smells. Further, as technology advances, new techniques, tools, architectures, programming languages and frameworks emerge to help developers cater to new hardware, platforms, and users. As such, some software may not be optimal for such new hardware, platforms, and users, and may benefit from new architectures that have emerged since the application's initial development. Developers may perform certain aspects of software refactoring, changing certain non-functional aspects of the application to address such concerns.

SUMMARY

In general, the techniques of this disclosure describe methods and devices (e.g., a processor executing a software tool) for users (e.g., application developers and application designers) to perform automated or semi-automated software refactoring of legacy software applications. The techniques described in this disclosure (e.g., as executed by a processor executing a software refactoring tool) may be configured to identify areas of optimization in legacy software applications which the software refactoring tool may automatically correct or may present potential corrections as options for correction to the user. The software refactoring tool may analyze source code to identify code violations (e.g., code smells) that violate best practices, allowing users to correct source code through use of the software refactoring tool (e.g., for improved readability, simplification). The software refactoring tool may analyze architectural aspects of the legacy software application in conjunction with design documents representing a desired architecture for the software application in preparation for a migration to another type of code architecture (e.g., a service-oriented architecture). This may assist developers in determining areas in which the legacy software application presents difficulties when migrating to the service-oriented architecture.

In one example, the disclosure describes a method including creating, by a computing device, an abstract syntax tree based on a source code file of a software application. The source code file includes source code defining operations of the software application. The method also includes traversing, by the computing device, the abstract syntax tree. The method further includes identifying, by the computing device and based on the traversing of the abstract syntax tree, one or more code violations present in the source code. The method also includes generating, by the computing device, at least one refactoring option for the one or more code violations, each refactoring option of the at least one refactoring option representing a change to the source code file that is configured to remediate the associated code violation. In another example, the disclosure describes a device including a memory configured to store a source code file and one or more processors in communication with the memory. The one or more processors are configured to create an abstract syntax tree based on a source code file of a software application. The source code file includes source code defining operations of the software application. The one or more processors are also configured to traverse the abstract syntax tree. The one or more processors are further configured to identify, based on the traversing of the abstract syntax tree, one or more code violations present in the source code. The one or more processors are also configured to generate at least one refactoring option for the one or more code violations, each refactoring option of the at least one refactoring option representing a change to the source code file that is configured to remediate the associated code violation.

In another example, the disclosure describes a computer-readable storage medium storing instructions that when executed by one or more processors cause the one or more processors to create an abstract syntax tree based on a source code file of a software application. The source code file includes source code defining operations of the software application. The instructions also cause the one or more processors to traverse the abstract syntax tree. The instructions further cause the one or more processors to identify, based on the traversing of the abstract syntax tree, one or more code violations present in the source code. The instructions also cause the one or more processors to generate at least one refactoring option for the one or more code violations, each refactoring option of the at least one refactoring option representing a change to the source code file that is configured to remediate the associated code violation.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
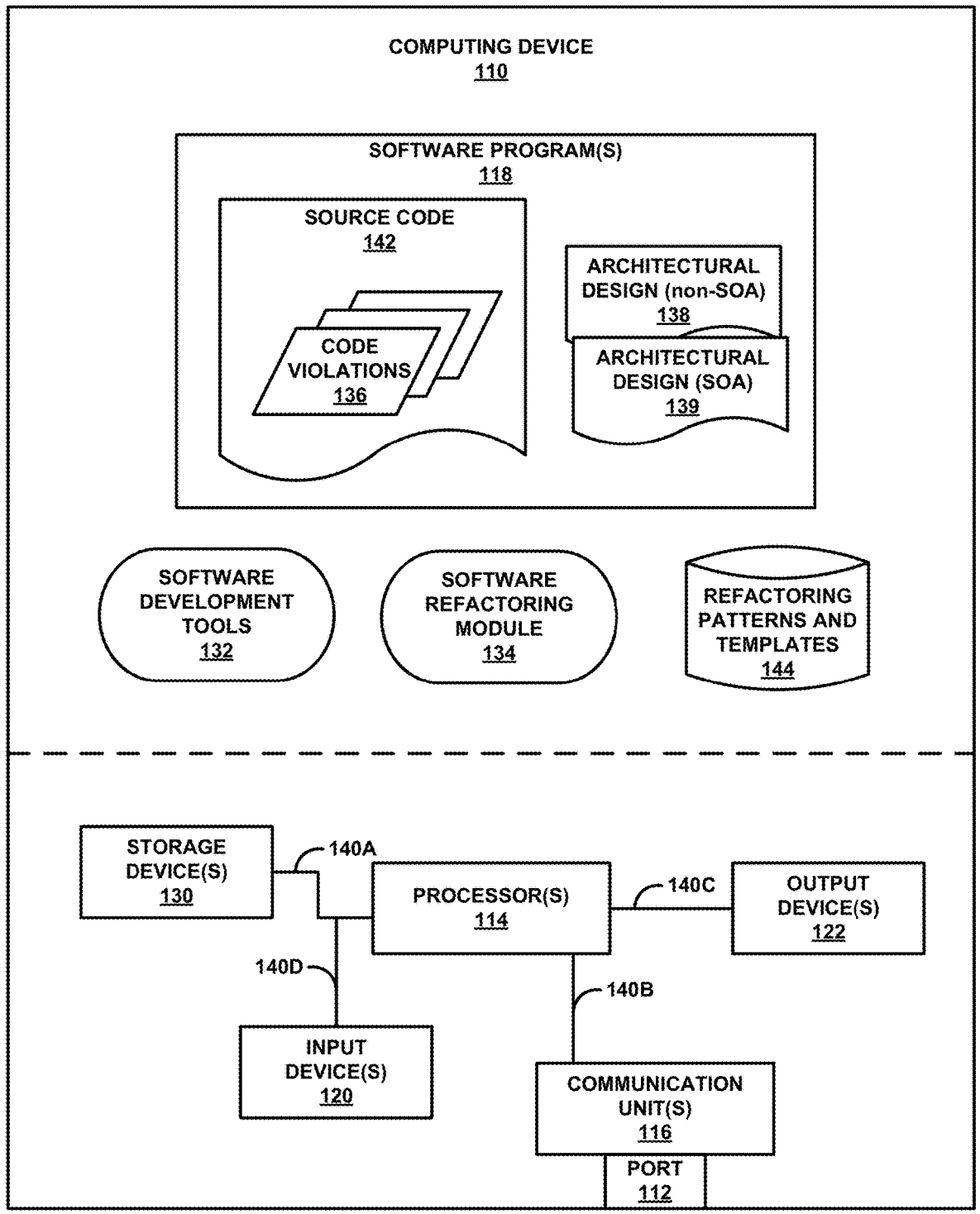
FIG. 1 is a block diagram illustrating an example of a computing device configured to perform software refactoring in accordance with one or more techniques of this disclosure.

Code refactoring (or just "refactoring") is a process of changing a software application (e.g., the application's source code), typically to improve nonfunctional aspects of the software application. Both modern and legacy software often include numerous code violations (e.g., imperfections, code smells) that can cause certain ongoing development or management issues with the software application. For example, such code violations may include poor readability of the code, unnecessary complexity, inefficient data structures, failure to adhere to aspects of coding best practices or design principles, code that inhibits migration to a service-oriented architecture, and so forth. Further, development and management of legacy software may be further complicated by age. For example, the original developers may have moved on to new endeavors or retired, or the general pool of skilled programmers in the legacy programming language may be depleted. As new software platforms and programming languages emerge, developers may migrate away from legacy tools, often resulting in a deficit in experts to support the legacy software.

Manual refactoring often involves significant resources and man-hours. When performing manual refactoring, developers may manually examine aspects of application source code or application architecture looking for imperfections and code smells in the source code. Many of these manual refactoring tasks require the developer to have extensive knowledge of the code base as well as the legacy development tools. Frequently, these tasks are usually not done by the original developers. In addition, many issues may go undetected during manual inspection. Due to these legacy issues, such development experience is often difficult to find, and such developers' time can be quite valuable.

Another issue with legacy software is the progression of technology over time. New hardware and software platforms and network technologies emerge, with new development tools and frameworks to support these new technologies. New software architectures, data structures, and design principles may also emerge with these shifts in technology. For example, applications that were once installed and executed locally on a user device may now be downloaded across a network, or have aspects executed remotely by a network-connected server. Application architectures that were once developed for reuse based on component-based principles may be better suited by a service-oriented approach.

To address the foregoing problems, one or more techniques described herein include one or more processors configured to execute a software refactoring tool that may be applied to automatically detect code violations in source code and generate refactoring options that can correct such code violations. Some refactoring options may facilitate migration of legacy applications to a service-oriented architecture (SOA). The software tool may be designed for use by a developer with limited skills in software development or with legacy coding tools. The software tool may identify source-code-level and architectural issues with software applications, such as, for example, issues affecting readability, organization, and efficiency of code. The software tool may be configured to resolve such issues and may include the developer in the decision-making process. The software tool may provide a collection of tools for refactoring source code and preparing code for migration to a service-oriented architecture. The software tool may integrate with other development tools, such as operating as an extension to Microsoft® Visual Studio® (VS), allowing developers to access areas of source code that the software tool has identified as violations and view automatic refactoring strategies that the software tool may perform if the developer chooses to implement those changes. When the developer selects a refactoring technique provided by the software tool, the software tool automatically changes the source code to implement those changes. As such, the one or more techniques described herein may improve the functioning of the computer based on the changes made to the application.

FIG. 1 is a block diagram illustrating an example of a computing device 110 configured to perform software refactoring, in accordance with one or more techniques of this disclosure.

Computing device 110 may be an end-user device (EUD). In some examples, computing device 110 may be a desktop computer or a computing tablet. However, in some examples, computing device 110 may be or otherwise include computerized eyewear, computerized headwear, other types of wearable computing devices.

Computing device 110 may be configured to utilize one or more different communication protocols for receiving and sending the data packets, including Wi-Fi (e.g., the Institute of Electrical and Electronics Engineers (IEEE) 802.11 standard), the Bluetooth™ protocol, a radio frequency communication, USB, the Ethernet industrial protocol, radio waves/frequencies, the Internet protocol suite, Java remote method invocation, dynamic data exchange, or any other communication protocol. Such communications protocols may be used, for example, to transmit and receive source code 142 from a code archive or a source code control system (not shown).

Computing device 110 may include port 112. Port 112 may serve as an interface between computing device 110 and other computers or peripheral devices, such as the source code control system. In some examples, port 112 may refer to a physical connection, and in other examples, port 112 may refer to logical or wireless connections. Electronically, when port 112 refers to a physical connection, several conductors where port 112 and a physical cable contacts connects may provide a medium to transfer signals between devices. In some examples, port 112 may refer to a portion of computing device 110 configured to wirelessly connect with other computing devices in order to exchange information and data packets/streams.

Computing device 110 may further include one or more processors 114. One or more processors 114, in one example, may be configured to implement functionality and/or process instructions for execution within computing device 110. For example, processors 114 may be capable of processing instructions stored in a storage device of computing device 110. Examples of processors 114 may include, any one or more of a microprocessor, a central processing unit (CPU), a controller, a digital signal processor (DSP), an application specific integrated circuit (ASIC), a field-programmable gate array (FPGA), or equivalent discrete or integrated logic circuitry.

Storage device(s) 130 of computing device 110 may include one or more software programs 118, software development tools 132, and software refactoring module 134, as will be described in more detail below. Storage device 130 may be configured to store information within computing device 110 during operation. Storage device 130, in some examples, is described as a computer-readable storage medium. In some examples, storage device 130 is a temporary memory, meaning that a primary purpose of storage device 130 is not long-term storage. In some examples, storage device 130 is a non-volatile storage medium, and may be configured as long-term storage (e.g., for storing source code 142). Storage device 130, in some examples, may be described as volatile memories, meaning that storage device 130 may not maintain stored contents when the computing device is turned off. Examples of volatile memories include random access memories (RAM), dynamic random-access memories (DRAM), static random-access memories (SRAM), and other forms of volatile memories known in the art. In some examples, storage device 130 is used to store program instructions for execution by processors 114.

Communication channels 140A, 140B, 140C, and 140D may interconnect each of one or more ports 112, one or more processors 114, communication unit 116, and storage devices 103, input device 120, and output device 122 for inter-component communications (physically, communicatively, and/or operatively). In some examples, communication channels 140A, 140B, 140C, and 140D may include a system bus, a network connection, an inter-process communication data structure, or any other method for communicating data.

Communication unit 116 of computing device 110 may communicate with external devices, such as the source code control system, a server device, a host device, and/or client devices, via one or more wired and/or wireless networks by transmitting and/or receiving network signals on the one or more networks. Communication unit 116 may include a network interface card, such as an Ethernet card, an optical transceiver, a radio frequency transceiver, or any other type of device that can send and receive information. Examples of such network interfaces may include, but are not limited to, Bluetooth™, infrared signaling, 3G, 4G, 5G, LTE, and Wi-Fi radios as well as Universal Serial Bus (USB) and Ethernet. In some examples, computing device 110 may utilize communication unit 116 to wirelessly communicate with another computing device that is operably coupled to computing device 110.

Input device 120 may be configured to receive a user interaction. For example, input device 120 may include a touch sensitive display, pressure sensitive display, mouse, keyboard, microphone, or other sensor to generate sensor data. Using the sensor data, one or more processors 114 may determine a user interaction. For example, in response to input device 120 generating sensor data indicating that a user has touched on or near a graphical element indicating a specific feature of software program 118A to be removed, one or more processors 114 may determine that a user interaction specifies the that the specific feature is an undesired feature.

Output device 122 may be configured to output to a user. For example, output device 122 may include a display, speaker, or other output device to output to a user. Examples of a display may include, but are not limited to, liquid crystal displays (LCD), light emitting diode (LED) displays, organic light-emitting diode (OLED) displays, e-ink, similar monochrome or color displays capable of outputting visible information, or other displays.

Computing device 110 includes a software program 118, software development tools 132, and software refactoring module 134. Although the example of FIG. 1 illustrates computing device 110 as including one software program, additional software programs may be used with computing device 110. Software program 118 includes a collection of instructions that performs a task when executed by one or more processors 114 (e.g., a software application). Software program 118 includes source code 142 that, when executed (e.g., after compilation), cause processors 114 to run an application. Software programs 118 may be written in any suitable programming language(s). As shown, software program 118 may include several undesired features, illustrated here as code violations 136. Software program 118 also intrinsically includes an architectural design 138, generally represented in FIG. 1 within software program 118 for purposes of illustration and discussion. Software program 118 may include multiple files, binaries, libraries, frameworks, interpreters, compilers, or other constructs that are used to execute the associated application.

Code violations 136 represent undesirable aspects of software program 118 that were programmed into software program 118 by developers (e.g., code smells). Code violations 136 may include, for example, code segments that are difficult to read, code segments that are unnecessarily complex, code segments that utilize inefficient data structures, code segments in which the developer failed to adhere to aspects of coding best practices, code segments that include outdated and unwanted data structures and coding techniques, code structures that improperly manage memory use, or code segments that inhibit migration to a service-oriented architecture. Some examples of code segments that are difficult to read are a line that embeds multiple function calls within that line, or a segment that includes no comments. One example of a code segment that is unnecessarily complex is a segment that includes many lines of code to perform an operation for which a function exists. One example of inefficient data structure use is using a long double for a variable that is used as a binary flag. One example of a failure to adhere to a coding best practice is expressly writing the same or similar blocks of code in different parts of the application when a single function could be written and called from those different parts. One example of a code structure that includes outdated or unwanted data structures and coding techniques include code structures containing the "GOTO" instruction. One example of a code structure that improperly manages memory use is a structure that creates a variable, allocates memory on the heap for that variable, and fails to delete the variable before the code structure completes. One example of a code segment that inhibits migration to a service-oriented architecture is a code segment that calls an improper encapsulated library. Code segments may be as small as a single line or portion of a line, or as large as an entire block, function, module, library, or other code unit. Code violations 136 are not necessarily already identified within software program 118, but instead are depicted in FIG. 1 as intrinsically a part of source code 142 for purposes of illustration and discussion. One function of software refactoring module 134 is to identify code violations 136 (e.g., by analysis of source code 142). Identifying code violations is discussed in greater detail below.

Architectural design 138 represents the architectural design of software program 118. Architectural design 138 is not a separately identifiable component of software program 118, but rather is meant here to illustrate an abstract representation of how software program 118 is constructed. Architectural design 138 refers to the high-level structures of software program 118, including software design concepts such as what language software program 118 is written in, what libraries or frameworks are used by software program 118, how various components of software program 118 work, whether together, independently, or with other applications, how software program 118 utilizes hardware, and so forth. Architectural design 138 often embodies certain fundamental choices made by developers throughout the application development process.

One software architecture of note is service-oriented architecture. In service-oriented architecture, application components are designed to provide services to other applications or application components through a communication protocol over a network, often providing discrete units of functionality. In some examples, software program 118 is not designed in a service-oriented style. For example, software program 118 may be designed in a component-based architecture. While useful for some legacy applications, it may be desirable to refactor a software program 118 that is in a component-based architecture into a service-oriented architecture. In this regard, software refactoring module 134 may be further configured to analyze the existing architectural design 138 of software program 118 and identify aspects of architectural design 138 that may be altered in order to affect a migration to another architecture type (e.g., migration from a component-based architecture to a service-oriented architecture). Software refactoring module 134 is not limited to performing a migration from a component-based architecture to a service-oriented architecture. Software refactoring module 134 may perform refactoring that causes migration to and from any number of code architecture types, include component-based architectures, service-oriented architectures, cloud computing architectures, layered architectures, representational state transfer (REST) architectures, and other architecture types. Architectural analysis of software program 118 is discussed in greater detail below.

Software development tools 132 may include tools used by developers during development and testing of software program 118. Some example software development tools include compilers, interpreters, frameworks, libraries, modules, execution environments, source code editing software, source code control systems, tool sets, application programming interfaces (APIs), debuggers, integrated development environments (IDEs), parsers, and so forth. In some examples, software development tools 132 include one or more front-end parsers that are configured to convert source code 142 into an abstract syntax tree, which may then be used to analyze aspects of software program 118. For example, the front-end parser may support Microsoft® Visual C++, Visual Basic (including VB.NET and VB6.0), F #, or C #, such as various open source or other commercial off-the-shelf (COTS) parsers (e.g., the .NET Compiler Platform, "Roslyn"). However, it should be understood that the techniques of this disclosure may be used with any programming languages, whether legacy or modern, including Fortran, COBOL, Java, Python®, etc. An abstract syntax tree is a tree representation of the abstract syntactic structure of source code in which each node of the tree denotes a construct occurring in the source code.

In some examples, software refactoring module 132 may be used to identify code violations 136 in source code 142. Source code 142 may include various code violations 136 embedded or otherwise included in source code 142 (e.g., programmed into source code 142 during application development). Software refactoring module 134 may be configured to use code violation patterns from a database of refactoring patterns and templates 144 to identify code violations 136. In some examples, software refactoring module 132 uses a compiler from software development tools 132 to generate an abstract syntax tree from source code 142 and uses the abstract syntax tree in conjunction with the code violation patterns to identify code violations 136. Some code violation patterns may be configured to identify extraneous (e.g., "bloated") code, such as functions that have too many lines (e.g., more than 50 significant lines), functions that are configured to receive too many parameters (e.g., more than five parameters), code structure patterns that are repeated throughout the code and could be their own functions, source code structures that are "dead code" (meaning they are never entered when the application is running), code structures that inefficiently create, manipulate, or query data structures, code structures that fail to clean up memory it allocates, or conditional statements that are nested too many levels deep (e.g., more than three layers deep). Other code violation patterns may be configured to identify architectural issues that may inhibit migration (e.g., architectural issues that may be refactored to affect migration) to a service-oriented architecture, such as services that communicate with other external services without using proper encapsulation through an interface, functionality that is repeated across multiple services when one service should perform that single action, services that are not abstracted (meaning consumers are aware of their inner logic), or services that depend on one or more separate services to complete their functionality.

In some examples, software refactoring module 134 may be used to identify code violations 136 associated with converting software program 118 to a different code architecture (e.g., a service-oriented architecture). In one example, software refactoring module 134 may analyze the architectural design 138 of the legacy application to determine aspects of software program 118 that present an incompatibility with or obstacle to migration of software program 118 to a service-oriented architecture. In some examples, software refactoring module 134 analyzes relationships between libraries used by software program 118 (e.g., how internal libraries interact with each other or with external libraries) to identify relationships that are not compatible with a service-oriented design. In some examples, application developers may generate design documents that describe an intended service-oriented design for software program 118. Software refactoring module 134 may compare the architectural design 138 of software program 118 to a service-oriented architecture (SOA) architectural design document 139 to identify components (e.g., architectural structures) of the legacy architectural design 138 of software program 118 to alter during migration. Architectural design documents 139 of the desired service-oriented architecture system may include information for how existing legacy components will be changed in the desired service-oriented architecture. In one example, software refactoring module 134 compares the legacy software program 118 with the desired service-oriented architecture design documents 139. Architectural design documents 139 may stipulate that one or more components in the legacy software programs 118 are desired to be a single service in the service-oriented architecture design. The code violation identification module 214 may identify code structures in the one or more components that match one or more of the code violation patterns.

In accordance with the techniques of this disclosure input device 120 may receive a user interaction for selecting, by a user (e.g., a software developer), one or more refactoring options identified by software refactoring module 134. For example, for a particular analysis of source code 142, software refactoring module 134 may present one or more refactoring options to the user via the output device 122. Each refactoring option may include, for example, an indication of a particular code violation 136 detected by software refactoring module 134 and may also include suggested changes to correct or otherwise address that particular code violation 136. In some examples, the user may optionally select, via the input device 120, one or more of the presented refactoring options for implementation. Upon selection of one or more refactoring options, software refactoring module 134 then implements the suggested changes to the application (e.g., altering the source code 142 to remove the particular code violation 136).

In some examples, software refactoring module 134 may automatically change software program 118 (e.g., alter the source code 142) to address some or all of the code violations 136 detected by the software refactoring module 134. For example, the user may configure software refactoring module 134 to automatically correct code violations 136 that exceed a pre-determined maximum number of significant lines in a particular function of software program 118 (e.g., 50 significant lines). As such, upon detection of a code violation 136 within a particular function that identifies that function as including 70 significant lines, the software refactoring module 134 may automatically change the source code 142 to change that function. For example, the software refactoring module 134 may create a new sub-function with a subset of the 70 lines of source code (e.g., 20 or more lines) and change the function to remove the subset of lines from the function and instead call that new sub-function, thereby reducing the number of lines in the function. Accordingly, some detected code violations 136 may be automatically corrected by the software refactoring module 134. In some examples, the software refactoring module 134 may be configured to automatically correct certain types of code violations 136, while other code violations 136 may be displayed to the user (e.g., for manual correction, or for correction by the software refactoring module 134 after user selection).

Software refactoring module 134 may enable developers to remediate code violations 136 that inhibit ongoing maintenance of the application. This may reduce the costs of ongoing support or future changes to the legacy application and may help alleviate the burden of finding developers skilled in the legacy application's language or with the legacy application's source code 142 itself. Software refactoring module 134 may also assist developers in migrating legacy applications into a service-oriented architecture. This may facilitate an easier, more automated transition from legacy architectures to a more modern architecture.

Figure 2:
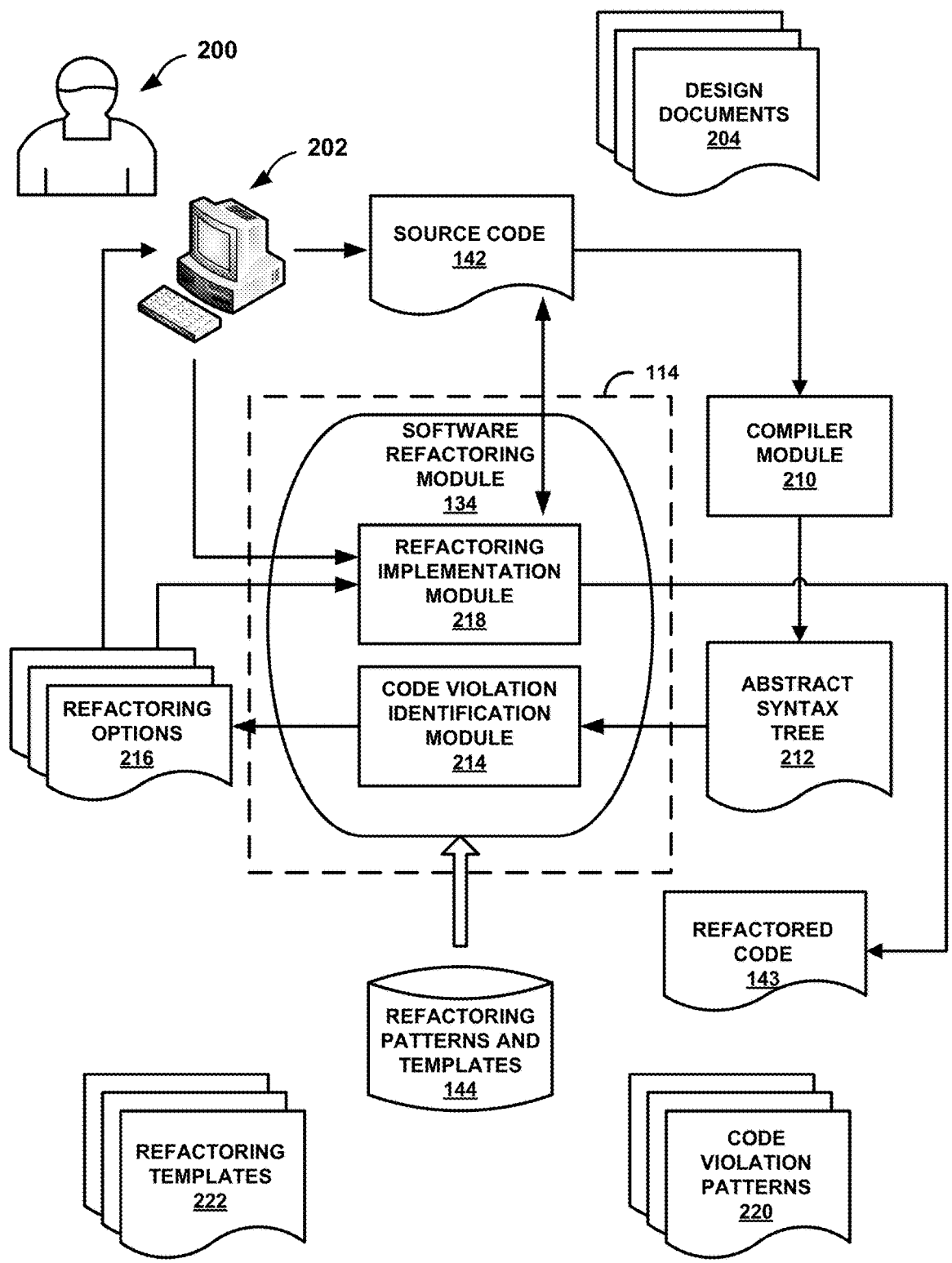
FIG. 2 is a block diagram illustrating an example process for software refactoring in accordance with one or more techniques of this disclosure.

FIG. 2 is a block diagram illustrating an example process for software refactoring in accordance with one or more techniques of this disclosure. FIG. 2 is discussed with reference to FIG. 1 for exemplary purposes only. FIG. 2 illustrates an exemplary workflow for software refactoring module 134. In this example, the processors 114 execute software refactoring module 134. The various operations, components, and data illustrated in FIG. 2 may be, in some examples, included in software refactoring module 134 of FIG. 1. However, in some examples, some of the operations, components, and data illustrated in FIG. 2 may be distributed differently. As shown, software refactoring module 134 includes a refactoring implementation module 218 and a code violation identification module 214 and may include compiler module 210 and refactoring patterns and templates 144.

Code violation identification module 214 analyzes aspects of an application (e.g., software program 118) for various types of issues associated with refactoring the application. Such examples issues may include the code violations 136 or architectural migration issues as discussed above with respect to FIG. 1. During operation, code violation identification module 214 identifies one or more refactoring options 216 associated with the application and may present the refactoring options 216 to a user 200 via a computing device 202. In some examples, computing device 202 is similar to the computing device 110 shown in FIG. 1 and may execute the software refactoring module 134 via processors 114. For example, code violation identification module 214 may present an accessible, semi-automated tool that guides the user 200 through the software refactoring process, allowing the user to customize settings for automatic refactoring or allowing the user to analyze identified refactoring options 216 and choosing which refactoring options 216 to remediate. Code violation identification module 214 may include code that implements a user-driven action, such as clicking on a button or selecting a menu item. In some examples, feature identification module 150 may include code that implements a user interface element, such as displaying refactoring options within a user interface (UI) frame. In some examples, the user interface element may be presented through a software development tool, such as an integrated development environment used to develop computer programs, web sites, applications and services, and mobile applications (e.g., as a Visual Studio plug-in).

Some refactoring options 216 generated by software refactoring module 134 may identify a location of a code violation 136 (e.g., within source code 142) and one or more remediation actions to address the identified code violation 136. For user-moderated refactoring options 216 (e.g., those not determined to be automatic), the user 200 may be presented with the location of the code violation 136 within the source code 142, as well as with the potential remediation actions. Based on their own analysis, the user 200 may then elect to ignore the code violation 136 (e.g., make no changes), manually remediate the code violation 136 (e.g., directly edit source code 142 to make desired changes), or to select one of the remediation actions provided by software refactoring module 134 (e.g., refactoring options) in order to create refactored code 143.

For automatic refactoring options 216, refactoring implementation module 218 applies changes to software program 118 (e.g., to source code 142) based on the refactoring options 216 identified by the code violation identification module 214 to create refactored code 143. In other words, and for example, some types of refactoring options 216 may be implemented without user involvement during the refactoring process. The software refactoring module 134 may analyze all refactoring options 216 identified by the code violation identification module 214 (e.g., based on the type of code violation 136 detected) and automatically send certain types of refactoring options 216 to the refactoring implementation module 218 for implementation. Other refactoring may be user-moderated. For example, some refactoring options 216 may be presented to the user 200, who may then select which refactoring options 216 to implement. The software refactoring module 134 then sends the selected refactoring options 216 to the refactoring implementation module 218 for implementation.

During operation, in one example, the user 200 causes processor 114 to execute software refactoring module 134 on computing device 202 to perform software refactoring on software program 118 to create refactored code 143. Software refactoring module 134 may apply source code 142 to the compiler module 210 to generate an abstract syntax tree 212. Compiler module 210 is configured to generate abstract syntax trees given source code of a particular programming language. In some examples, compiler module 210 may be executed by processors 114. Compiler module 210 may be a programming language compiler such as, for example, Microsoft Visual C/C++ or C #, Microsoft Visual Basic parser, or the Microsoft open source compiler "Roslyn," or other commercial off-the-shelf compiler, and which supports generating abstract syntax trees for the supported programming language. More specifically, compiler module 210, in this example, operates to convert source code 142 into an intermediate representation of the source code 142 in the form of the abstract syntax tree 212. The abstract syntax tree 212 is a tree representation of the abstract syntactic structure of source code 142 as written in a particular programming language (e.g., the language in which the source code 142, or component thereof, is written, and for which the compiler module 210 supports). In some examples, compiler module 210 may be further configured to convert the abstract syntax tree 212, as originally produced by one or more different compiler types (e.g., language-specific), into a common syntax tree structure (e.g., language-neutral) that may be analyzed with generalized patterns to detect code violations 136. Code violation identification module 214 uses the abstract syntax tree 212 generated by compiler module 210 to identify code violations 136 within the application. Code violations 136 represent undesirable aspects of software program 118 that were programmed into software program 118 by developers. Code violations 136 may include, for example, code segments that are difficult to read, code segments that are unnecessary complexity, code segments that utilize inefficient data structures, code segments in which the developer failed to adhere to aspects of coding best practices, code segments that include outdated and unwanted data structures and coding techniques, code structures that improperly manage memory use, or code segments that inhibit migration to a service-oriented architecture.

In some examples, code violation identification module 214 identifies instances in which a particular block of source code (e.g., a function, a property declaration, a constructor) includes too many lines. Code blocks with too many lines may cause difficulties with readability. For example, code violation identification module 214 may count a number of significant lines within a particular block of source code and identify that block as a code violation 136 if the number of significant lines exceeds a pre-determined threshold (e.g., 50 lines). Such a code violation may be referred to herein as an "excessive lines" code violation. In one example, all lines of source code 142 are treated as significant lines except certain types of lines. Some lines may be considered insignificant in this context, and thus may not be counted toward the total. For example, a line containing only documentary comments may be excluded as insignificant for this purpose (e.g., as the line does not get compiled, as the line may help with readability or best practices). A line containing only blanks or a bracket, or only a variable increment may be excluded as insignificant (e.g., as contributing to readability, as routine or minimal operation). In some examples, multiple lines may be counted together as a single line. For example, a single function call or other statement or expression that spans multiple lines (e.g., a function call that separates parameters onto additional lines for readability) may be counted as a single line.

Code violation identification module 214 may analyze abstract syntax tree 212 to count significant lines within a particular function or other block of code. For example, code violation identification module 214 may identify each node in abstract syntax tree 212 that represents a function declaration or another declaration that holds a significant amount of code (e.g., property declarations, constructs) and iterates through each of these nodes to determine the number of significant lines under each node. Refactoring patterns and templates 144 may include a code violation pattern 220 associated with counting significant lines, such as statements that are considered significant or insignificant. As such, each statement in abstract syntax tree 212 that is determined to be significant or insignificant based on the code violation pattern 220 is then counted or not counted, respectively, for the significant statement count for that function. If the significant statement count exceeds the pre-determined threshold, then a code violation 136 is identified, with the location within the source code 142 being the location of that function.

As one example, code violation identification module 213 may be configured to determine how many significant lines are present in each node of abstract syntax tree 212 by parsing through each descendant node. Consider the following example code with an if statement:

```
if (condition)
{
    doSomething( );
}
```

Code violation identification module 213 may be configured to parse through each descendant node (if, (, condition, ), {, doSomething( );, }). Code violation identification module 213 may be configured to consult a rule indicating what is considered a significant line, and if the node meets that rule, code violation identification module 213 increments the line count. In the example code above, the if node (which would contain (, condition, and)) would be counted as one significant line. The { and} nodes would not be counted, and the doSomething( ); node would be counted as one. So, code violation identification module 213 would determine that the parent node representing the entire if statement would be two significant lines.

For each excessive lines code violation 136 identified by code violation identification module 214, code violation identification module 214 may also generate one or more remediation actions to address that particular significant line code violation 136. For example, to remediate a function that has a number of significant lines that exceeds the pre-determined threshold, code violation identification module 214 may analyze the abstract syntax tree 212 to identify a subset of X statements that can be removed from the parent function and moved into its own sub-function, where the removal of X lines from the parent function by software refactoring module 134 causes the total number of resultant significant lines in the parent function to be reduced below the pre-determined threshold. In some examples, the prospective code blocks may be further analyzed with respect to dependencies and other factors to determine whether the prospective code block is a viable candidate for remediation. The remediation actions may then include generating a new function within source code 142, moving the X lines associated with the identified statements into the new function, then replacing the X lines with an appropriately-formed call to the new function. Further, the remediation actions may also include identifying variables used within the code block and determining whether those variables need to be passed into the sub-function, or if they are created and used only in the nodes passed to the sub-function. Variables created and used only within the moved nodes are considered independent of the original function (e.g., the variable is not referenced anywhere outside of the candidate code block). Variables that are dependent on the original function may be passed as parameters to the sub-function (e.g., by reference or by value, based on how the parameter is used in the original function).

In some examples, code violation identification module 214 identifies instances in which a particular procedure (e.g., function, method) includes too many parameters. For example, code violation identification module 214 may count a number of parameters expected by the particular procedure and, if the number of parameters exceeds a pre-determined threshold (e.g., more than five parameters), then that particular procedure is identified as a code violation 136. Such a code violation may be referred to herein as an "excessive parameters" code violation. Code violation identification module 214 may analyze abstract syntax tree 212 to count the number of parameters defined for a particular procedure. For example, a "Function Declaration" node (or similar node like a constructor) will have descendant nodes that include each parameter as its own node. Code violation identification module 21 analyzes the function declaration node and counts the number of parameter nodes in its descendants.

For each excessive parameters code violation 136 identified by code violation identification module 214, code violation identification module 214 may also generate one or more remediation actions to address that particular excessive parameters code violation 136. For example, to remediate a procedure that has a number of parameters that exceeds the pre-determined threshold, code violation identification module 214 may identify parameters to the procedure that are extraneous (e.g., that are not necessary to pass into the procedure as a parameter). Some parameters may not be used within the procedure, and thus may be identified for removal from the procedure definition as one remediation option. As another remediation option, code violation identification module 214 may identify a combination of parameters to combine into a composite data type (e.g., a class, a structure) to reduce the number of parameters in the procedure definition (e.g., passing the composite data element as a parameter in lieu of the individual parameters).

In some examples, code violation identification module 214 identifies instances in which a particular code block (e.g., function, method) includes too many nested control flow constructs of certain types. Control flow constructs analyzed for nesting depth include conditional statements (e.g., "if" "else"), multi-way branches (e.g., "case," "switch"), and looping constructs (e.g., "for," "while," and "do" type loops). Nesting control flow constructs too deeply may cause difficulties with readability and understandability.

For example, code violation identification module 214 may count a number of parent control flow constructs present at a particular control flow construct to determine a nesting depth at that particular control flow construct, where each ancestor control flow construct represents a nested layer of the particular control flow construct. If a particular control flow construct adds an additional layer that causes the total nesting depth to exceed a pre-determined threshold (e.g., five layers), then that particular control flow construct, and optionally that control flow construct's code block or any deeper child control flow constructs, may be identified as a code violation 136. Such a code violation may be referred to herein as an "excessive nesting" code violation.

Code violation identification module 214 may analyze abstract syntax tree 212 to determine whether there are any occurrences of excessive nesting. For example, code violation identification module 214 may walk the abstract syntax tree 212, incrementing a depth counter when a control flow construct of a particular type (e.g., conditionals) or set of types (e.g., looping constructs) is encountered while descending the abstract syntax tree 212 and decrementing the depth counter when a control flow construct is encountered ascending the abstract syntax tree 212. As such, at any given time during the walk of the abstract syntax tree 212, the depth counter represents the number of ancestor control flow constructs of the current node. When code violation identification module 214 encounters a new control flow construct (e.g., when first descending to a node), and after incrementing the depth counter, code violation identification module 214 may test to determine whether the current control flow construct causes the depth counter to exceed the pre-determined threshold. In such situations, code violation identification module 214 identifies that current control flow construct as an excessive nesting code violation. In some examples, the depth counter may be increased and/or decreased during analysis of the abstract syntax tree of the function. Code violation identification module 214 may analyze abstract syntax tree 212 in the order of how the source code (e.g., source code 142) is compiled.

For example, assume a function1( ) that is called inside a conditional step. Code violation identification module 214 does not step into function1( ) at that point. Rather, code violation identification module 214 treats function1( ) as any other node that is not a conditional, which means that code violation identification module 214 does not change the depth counter. If the function1( ) node is followed by another conditional statement, then code violation identification module 214 increase the depth counter when the conditional is reached. Alternatively, if the conditional statement that surrounds function1( ) ends after function1( ), with no more conditional statements, then code violation identification module 214 decreases the depth counter by one and continues parsing outside the conditional statement being analyzed, looking for additional conditionals to count.

For each excessive nesting code violation 136 identified by code violation identification module 214, code violation identification module 214 may also generate one or more remediation actions to address that particular code violation 136. In some examples, to remediate an excessive nesting code violation 136, code violation identification module 214 may identify a code block that includes the identified control flow construct and may move that code block into a separate sub-function, as well as remove the code block from the original location and replace the code block with a call to the sub-function, complete with any parameters supporting the new function. In some examples, for a particular control flow construct, code violation identification module 214 may ascend to the parent control flow construct and identify the code block of the parent control flow construct as the candidate code block. That candidate code block may be evaluated for external dependencies or based on other factors described below before presenting that code block as a refactoring option 216 for the particular code violation 136.

In other examples, to remediate an excessive nesting code violation 136, code violation identification module 214 may replace some nested conditionals with guard clauses. For example, for an "if/else" statement ends immediately after the "if/else" is completed, then the blocks contained within the "if/else" statement may be replaced with return statements. For example, presume source code 142 includes the following legacy function:

```
public double nestedFunction(int x) {
    double result = 0;
    if (x < 1) {
        result = 1;
    }
    else {
        if (x < 3)
            test(x, x, x);
        else {
            if (x < 4)
                result = 3;
            else if (x < 5)
                result = 4;
        }
    }
    return result;
}.
```

Presume, for this example, that the pre-determined threshold for nesting depth is two, and conditionals are a type of construct evaluated for excessive nesting. In other words, a nesting depth of three is too deep, and detection of a nesting depth of three or more indicates an excessive nesting code violation 136. Here, for example, at the statement "result=1", the nesting depth is one conditional deep (e.g., just the "if (x<1)" conditional). At statement "test(x, x, x)", the nesting depth is two conditionals deep (e.g., the first level being the first "else {", the second level being the "if (x<3)" conditional). Neither of the above two example statements exceed the threshold for nesting depth. However, both of the statements "result=3" and "result=4" do exceed the threshold. More specifically, at statement "result=3", the nesting depth is three conditionals deep (e.g., the first "else {", the second "else {", and the "if (x<4)" conditional being the third level). At statement "result=4", the nesting depth is four conditionals deep (e.g., the first "else {", the second "else {", the third level being the "else" of the "else if (x<5)" line, and the fourth level being the "if (x<5)" conditional of the "else if (x<5)" line. As such, in some examples, the third and fourth level conditionals may be identified as excessive nesting code violations 136, and in other examples, the entire legacy function may be identified as containing excessive nesting.

Now consider the following example refactored function:

```
public double nestedFunction(int x) {
    double result = 0;
    if (x < 1) {
        return 1;
    }
    if (x < 3){
        test(x, x, x);
        return result;
```

```
    }
    if (x < 4)
        return 3;
    if (x < 5)
        return 4;
    return result;
}.
```

The example refactored function is functionally equivalent to the legacy function (e.g., generates the same results in all conditions). Further, unlike the legacy function, the maximum conditional depth of the refactored function never exceeds one. As such, the refactored function results in a reduction in nesting depth for conditionals, thereby improving readability, maintainability, and cleanliness of the function's source code.

In order to determine whether a particular legacy block of code is appropriate for this type of nesting reduction, code violation identification module 214 analyzes the legacy code (e.g., the function's sub-tree within the abstract syntax tree 212). As one example, code violation identification module 214 may be configured to traverse through abstract syntax tree 212 and may encounter an if statement. If so, code violation identification module 214 may be configured to check if the function immediately leaves (e.g., ends) after the if completes. To do this, code violation identification module 214 may be configured to check which node (if any) immediately follows the if statement. This would be the node immediately after the else's closing bracket, as the else is a child of the if statement. If the immediate executing node is a return statement or a throw statement (both are statements that immediately cause the function to leave) or if there is no immediate sibling node (meaning that the if/else is the last executed node in the function), then code violation identification module 214 may determine that the function immediately leaves after this if/else completes.

Code violation identification module 214 may then check that the if statement does in fact have an else/else if attached to it. If there is no else statement, then software refactoring module 134 would not ameliorate any confusion by adding guard clauses.

Code violation identification module 214 may perform the above process recursively. For example, once code violation identification module 214 checks one if statement, code violation identification module 214 may then check any if statements that are inside of the outer if statement. In this way, if the entire content nestedFunction( ) function was inside of an if statement, code violation identification module 214 could still use the same process to add guard clauses to the inner if statements. The same is true for else if statements, which are inner if statements as well. The outer if statements do not have to have else statements attached, as long as an inner if has an else, and the next immediate executing node after that else leaves the function, then software refactoring module 134 can perform that refactoring.

For some types of code violations, code violation identification module 214 may identify multiple different ways to remediate the identified code violation 136. For example, for the situation in which the function has too many significant lines, code violation identification module 214 may identify multiple blocks that may be suited to moving and sufficient enough to reduce the length of the parent function under the threshold. As such, the user 200 may be presented with multiple refactoring options 216 for a particular code violation 136, and thus may elect which refactoring option 216 for the software refactoring module 134 to implement.

Code violation identification module 214 may identify instances in which a particular code block (e.g., function, method) is architected contrary to one or more principles of service-oriented architecture. One such principle is service encapsulation. To comply with service encapsulation, libraries that are in different services should be configured to only communicate with each other through interface calls (e.g., instead of one library directly calling a class in a library in a separate service).

In some examples, code violation identification module 214 inspects calls between libraries to detect whether any instances of improper encapsulation exist. Such a code violation may be referred to herein as an "improper encapsulation" code violation. For example, code violation identification module 214 may identify a configuration file that lists all libraries that belong to a particular service, and which libraries belong to an external service. This configuration file may, for example, be a part of architectural design 138, and may be manually generated by the user 200 or may be automatically generated based on identified libraries of the external service. This configuration file may be used to determine which libraries are allowed to communicate without encapsulation and which should communicate with encapsulation. In some examples, internal libraries within the same service do not need to use encapsulation, but communication from an internal library within one service to some external library does need to use encapsulation.

Code violation identification module 214 analyzes the abstract syntax tree 212 to locate calls that are made to libraries. For each node that includes a call to a library, code violation identification module 214 identifies which library is the subject of the call and determines whether or not that call should be encapsulated. If the call should be encapsulated but is not encapsulated, then code violation identification module 214 identifies that library call as an improper encapsulation code violation 136.

In some examples, code violation identification module 214 examines the architectural design 138 of the software program to identify whether there are any architectural structures or relationships that inhibit a migration to service-oriented architecture. For example, code violation identification module 214 may utilize design documents 204 developed to describe architectural aspects of the software program 118 under a projected service-oriented architecture. In other words, design documents 204 describe what an updated version of the software program 118 would look like under a service-oriented architecture. Such design documents 204 may be developed in a standard format such as, for example, Unified Modeling Language (UML), service-oriented modeling framework (SOMF), and so forth. Based on the design documents 204, code violation identification module 214 may generate a tree that represents the planned architecture. Further, code violation identification module 214 may also create a design tree for the legacy version of the software program 118 (e.g., based on Visual Studio files). Code violation identification module 214 may then compare the two trees and identify architectural differences between the current architecture and the planned next iteration of architectural design leading to a service-oriented design.

Figure 3:
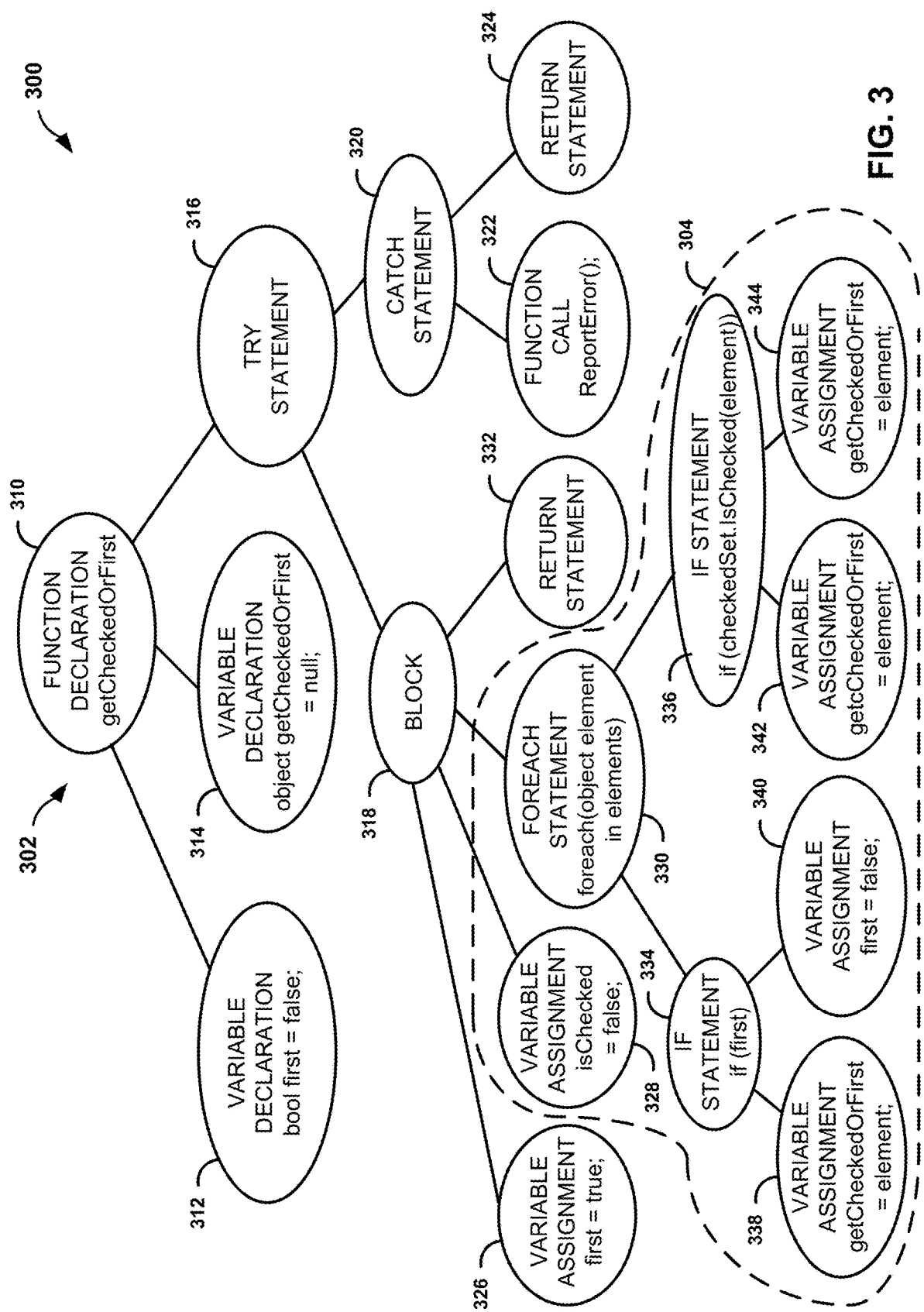
FIG. 3 is a graph of an example abstract syntax tree that may be generated from source code of software program, and that may be used by software refactoring module to identify and implement refactoring options.

FIG. 3 is a graph of an example abstract syntax tree 300 that may be generated from source code 142 of software program 118, and that may be used by software refactoring module 134 to identify and implement refactoring options 216 for code violations 136. Abstract syntax tree 300 may be generated by the compiler module 210 and may be similar to the abstract syntax tree 212, as shown in FIG. 2. FIG. 3 is discussed with reference to FIGS. 1 and 2 for exemplary purposes only. As shown, abstract syntax tree 300 includes a number of nodes 310-344, with each individual node representing a component of source code. The example abstract syntax tree 300 represents one function 302 of many functions or other code blocks within software program 118.

In the example, abstract syntax tree 300 represents the following example block of source code (e.g., the "legacy" version of the function 302):

```
private object GetCheckedOrFirst(List<object> elements, ref bool
isChecked) {
    bool first = false;
    object getCheckedOrFirst = null;
    try {
        first = true;
        isChecked = false;
        // Look for a selected element in elements
        // Use the first element if nothing selected in elements
        foreach (object element in elements) {
            if (first) {
                getCheckedOrFirst = element;
                first = false;
            }
            if (checkedSet.IsChecked(element)) {
                isChecked = true;
                getCheckedOrFirst = element;
            }
        }
        return getCheckedOrFirst;
    }
    catch (Exception ex) {
        ReportError("GetChekcedOrFirst: ", ErrorHandler,
            ex, Common.DEFAULTSEVERITY, false, true);
        return getCheckedOrFirst;
    }
}
```

More specifically, abstract syntax tree 300 includes a root node 310 that represents a function declaration of the function 302, entitled "getCheckedOrFirst." This example function 302 is relatively simplistic for ease of illustration. The function 302 further includes two variable declaration nodes 312, 314 and a "try" statement node 316 as immediate children of the root node 310. The try statement node 316 includes a block node 318 (e.g., representing the bulk of the instructions included in the function 302, represented by nodes 326-344), as well as a "catch" statement node 320 (e.g., including nodes 322, 324).

In the example, code violation identification module 214 has identified an excessive lines code violation 136 associated with the example function 302 and, as such, code violation identification module 214 analyzes the abstract syntax tree 300 to identify a block of code that may be moved out of the function 302 and into a sub-function. More specifically, code violation identification module 214 examines the abstract syntax tree 300 to determine which nodes could be moved. Software refactoring module 134 may analyze each node in abstract syntax tree 300 and assembles a list of sequential nodes that could be moved from the larger node. When abstract syntax tree 300 analyzes each node, software refactoring module 134 determines the line count of that node and determines if there is a node inside the node being analyzed that cannot be moved. In one example, software refactoring module 134 may determine that if a node inside that node cannot be moved, then the parent node cannot be moved either. Also, if a node contains more lines than the maximum allowable lines threshold, then software refactoring module 134 may determine that such a node is unmovable as well, since moving such a node to a new function would make that function too long.

When software refactoring module 134 reaches a sequential node that cannot be moved, software refactoring module 134 first checks if the list of sequential nodes already gathered contains an overall line count larger than the number of lines that have to be moved in order for the function to meet the line limit. If the sequential nodes gathered count for enough lines to move to a new function, then software refactoring module 134 move those nodes. If not, software refactoring module 134 checks how many potential lines in a row could be extracted from the unmovable node. Just because a node is unmovable does not mean that the node contains no children that can be moved. Here, software refactoring module 134 may perform a line count that indicates the maximum number of sequential lines that could potentially be moved to a new function. Software refactoring module 134 do this using the same process described above, but the nodes are not gathered the nodes. Rather, software refactoring module 134 determines the maximum number of lines that could be moved.

If that maximum is larger than the amount needed to be moved, software refactoring module 134 starts the sequential node gathering process on the unmovable node. If it is smaller, software refactoring module 134 checks the maximum number of sequential nodes that can be gathered from all nodes that have not been analyzed yet. This would be all nodes following the first unmovable node encountered. If that node is also not larger than the number of lines that are to be moved to a new function, then software refactoring module 134 can determine that to split the function up into more than two functions. In this case, software refactoring module 134 analyzes each maximum line count (the line count of the sequential nodes we gathered prior to the unmovable node, the maximum number of movable lines inside the unmovable node, and the maximum number of movable lines in the subsequent nodes after the unmovable node). Software refactoring module 134 then either moves the already gathered sequential nodes or software refactoring module 134 analyzes the unmovable node or subsequent nodes and gathers sequential nodes following the same process described above. Once the sequential nodes list is large enough to move (meaning it is larger than one line and smaller than the maximum amount of lines allowed minus 1 to allow for some wiggle room in the new function), software refactoring module 134 selects those lines to move to a new function.

In the example of FIG. 3, software refactoring module 134 iterates through the abstract syntax tree 300 with FunctionDeclaration root 310. Software refactoring module 134 counts that VariableDeclaration node 312 is 1 line and has no unmovable descendant nodes. Software refactoring module 134 adds VariableDeclaration node 312 to the sequential nodes list. Software refactoring module 134 counts that VariableDeclaration node 314 is 1 line and has no unmovable descendant nodes. Software refactoring module 134 adds VariableDeclaration node 314 to the sequential nodes list.

Then, when software refactoring module 134 reaches the TryStatement node 316, software refactoring module 134 determines that TryStatement node 316 is 11 lines long (e.g., longer than a maximum line setting) and contains an unmovable descendant node (ReturnStatement 332). In this example, software refactoring module 134 analyzes inside that node and determines that software refactoring module 134 could potentially move 9 lines to a new function. The original sequential nodes line count is 2, and there are no subsequent nodes to look in. Then, software refactoring module 134 clears our sequential nodes list and analyzes the child nodes of TryStatement 316. The first child node Block 318 contains 10 lines and an unmovable descendant node. Software refactoring module 134 determines that 9 of those 10 lines are movable, and the subsequent node (CatchStatement 320) contains one movable line and an unmovable node. So, software refactoring module 134 analyzes the children of Block 318.

The first child, Variable Assignment 326, is one line and contains no unmovable nodes. Software refactoring module 134 adds Variable Assignment 326 to the sequential nodes list. The second child is Variable Assignment 328 and is one line and contains no unmovable nodes. Software refactoring module 134 adds Variable Assignment 328 to the sequential nodes list. The next node, ForeachStatement 330, contains 7 movable lines and no unmovable nodes. The next node, ReturnStatement 332 is unmovable. Software refactoring module 134 determines the number of total lines in sequential nodes (e.g. 9). Software refactoring module 134 drops the first node in the sequential nodes list (326) because it is desirable to have the new function be at least two lines below the maximum number of lines allowed. The "two lines below the maximum" requirement is configurable and may be set as desired. Software refactoring module 134 moves the sequential nodes (328, 330—with 330's descendant nodes 334, 338, 340, 336, 342, 344) to a new function and replaced with a new FunctionCall node that calls that new function.

Nodes that are not candidates to be moved include those that contain more lines than the maximum movable limit (e.g., the maximum allowed may be a function minus 2 or some other number), those that are dependent on their location in the function (e.g., return statements), and any node that contains a descendant node that is unmovable. There are also some nodes that can be considered unmovable depending on the situation. Breaks and Continues, for example, cannot be moved as a single node. If you were to move the contents of a for loop that contained a Break to a new function, then that Break would create an error since it would no longer refer to the For Loop. However, if the entire For Loop is moved to a new function, then the Break statement is movable in that context, since the For Loop still exists for it to refer to. In the example above, the catch statement is unmovable and would be unmovable even if it didn't contain the return statement. Moving a catch statement on its own to a new function is not allowed and would create an error, since a catch must refer to a try. Other examples of this include ElseStatements, FinallyStatements, SwitchCases, and others. As the tree is analyzed, each node is analyzed in the order they appear in the tree and the number of sequential lines that are movable inside that node is determined. Nodes are considered movable if they do not meet the requirements above to be unmovable, contain less total lines than the maximum number of movable lines, and contain no unmovable nodes (they can include the breaks, elses, etc. as long as those nodes are in the proper context). In this example, the nodes that are marked as candidates to be moved include nodes 312, 314, 322, 326-330, and 334-344. The nodes that are marked as not candidates to move include nodes 324, 332, 318, 316, 320.

In some examples, some nodes may be marked based on whether that node has any descendant nodes that are not candidates to be moved. For example, if a particular node has one or more descendants that are not candidates to be moved, then that particular node is not a candidate to be moved and may be marked as such. In this example, node 320 is marked as not a candidate to be moved because one of its children, node 324, is not a candidate to be moved, and node 318 is also marked as not a candidate to be moved because one of its children, node 332, is marked as not a candidate to be moved. Similarly, since nodes 318, 320 are not candidates to be moved, then statement 316 is also not a candidate to be moved.

Once the nodes of the abstract syntax tree 300 have been individually examined and marked for prospective movement, code violation identification module 214 then looks for a block of nodes. For example, code violation identification module 214 may search for a node or set of multiple contiguous nodes that are all candidates to be moved (e.g., where all of the offspring nodes are also candidates to be moved, as described above). In this example, nodes 328, 330, 334-344 are identified as a code block 304 that is a candidate to be moved.

In some examples, the abstract syntax tree 300 may include multiple code blocks 304 that are candidates to be moved. Each of these multiple code blocks 304 may individually represent different refactoring options 216. In some examples, multiple code blocks 304 may be considered as a single refactoring option 216.

In some examples, the number of significant lines within the code block 304 may be determined. Code violation identification module 214 may then subtract the number of significant lines within the code block 304 from the total number of significant lines in the legacy function 302 (e.g., before extracting the code block 304) to determine whether the resultant reduced number of total lines will be below the threshold. If the resultant total reduces the size of the function 302 below the threshold, then that code block 304 may be identified as a refactoring option 216. In situations in which multiple code blocks 304 are identified as potentials to move, code violation identification module 214 may provide only the largest code block 304 as a refactoring option 216. In some examples, none of the identified code blocks 304, individually, may reduce the resultant total enough to completely remedy the code violation 136. As such, code violation identification module 214 may evaluate moving multiple code blocks 304 (e.g., with each code block 304 being moved to its own new sub-function). To determine whether a subset of the identified code blocks 304 satisfy the reduction, code violation identification module 214 may total the number of significant lines from multiple code blocks 304 and subtract that total from the total number of significant lines in the legacy function 302 to determine whether the subset of identified code blocks 304 will suffice. If a suitable subset of code blocks 304 is identified, then that subset of code blocks 304 are presented as a refactoring option 216.

Once the code block 304 has been identified, code violation identification module 214 creates a new function (e.g., for each code block 304 that is a part of the refactoring option 216). Each new function contains the lines of source code from the code block 304, along with additional supporting structures (e.g., function definition with parameters, variable declaration, and so forth). A modified version of the legacy function 302 is also created, replacing the content of the code block 304 with a function call to the new function. These modified functions may be presented with the refactoring option 216, thereby allowing the user 200 to evaluate the proposed changes associated with the refactoring option 216.

Figure 4:
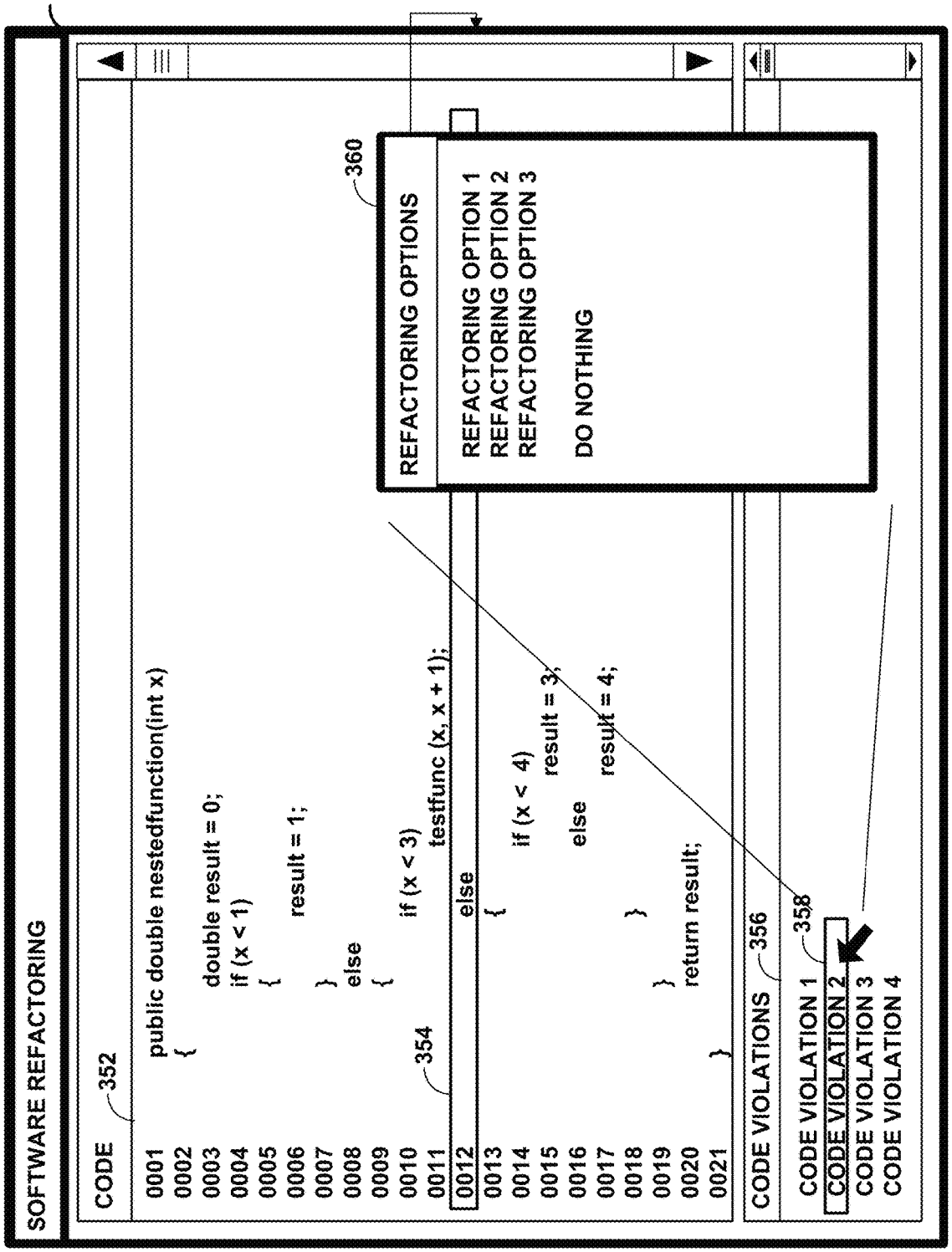
FIG. 4 is a conceptual diagram showing an example user interface according to examples of the disclosure.

FIG. 4. is a conceptual diagram showing an example user interface according to examples of the disclosure. User interface 350 may be displayed by processor 114 on an output device 122 (e.g., a display) that may be viewable by user 200 (e.g., on computing device 202 of FIG. 2). User 200 may interact with user interface 350 using any variety of input devices 120 (see FIG. 1), not limited to a mouse, touchpad, touchscreen or other user input technique.

User interface 350 may include a window 352 for displaying lines of code (e.g., source code 142) and a window 356 for displaying identified code violations in source code 142 (e.g., code violations 136 identified by software refactoring module 134 of FIG. 1). In some examples, window 352 and window 356 may be the same window.

As discussed above, in some examples, software refactoring module 134 may automatically refactor source code 142 without any input from user 200 through user interface 350. In other examples, software refactoring module 134 may be configured to refactor the code (e.g., using refactoring implementation module 218) in accordance with input from user 200.

As shown in FIG. 4, user 200 may select one of the code violations displayed in window 356. In this example, user 200 has selected code violation 3. User interface may display a highlight, an underline, a box, a color change, and/or other indication 358 to show which of the code violations has been selected. In some examples, in response to the selection of a particular code violation, user interface 350 may also display a highlight, an underline, a box, a color change, and/or other indication 354 that indicates what line or lines of code is related to the selected code violation.

In addition, in response the selection of a particular code violation, user interface 350 may present user 350 with one or more refactoring options indicating how the code may be refactored to correct the selected code violation. In the example of FIG. 4, the refactoring options are shown in a pop-up window 360. However, any method of displaying the refactoring options may be used. User 200 may then select one of the refactoring options available for the selected code violations. In some examples, user 200 may elect to not correct a code violation by selecting the "do nothing" option in window 360. In other examples, user interface 350 may be further configured show a preview of how the code will change in response to the selection of one of the refactoring options. This preview may be helpful in helping user 200 determine which of the refactoring options to choose.

Figure 5:
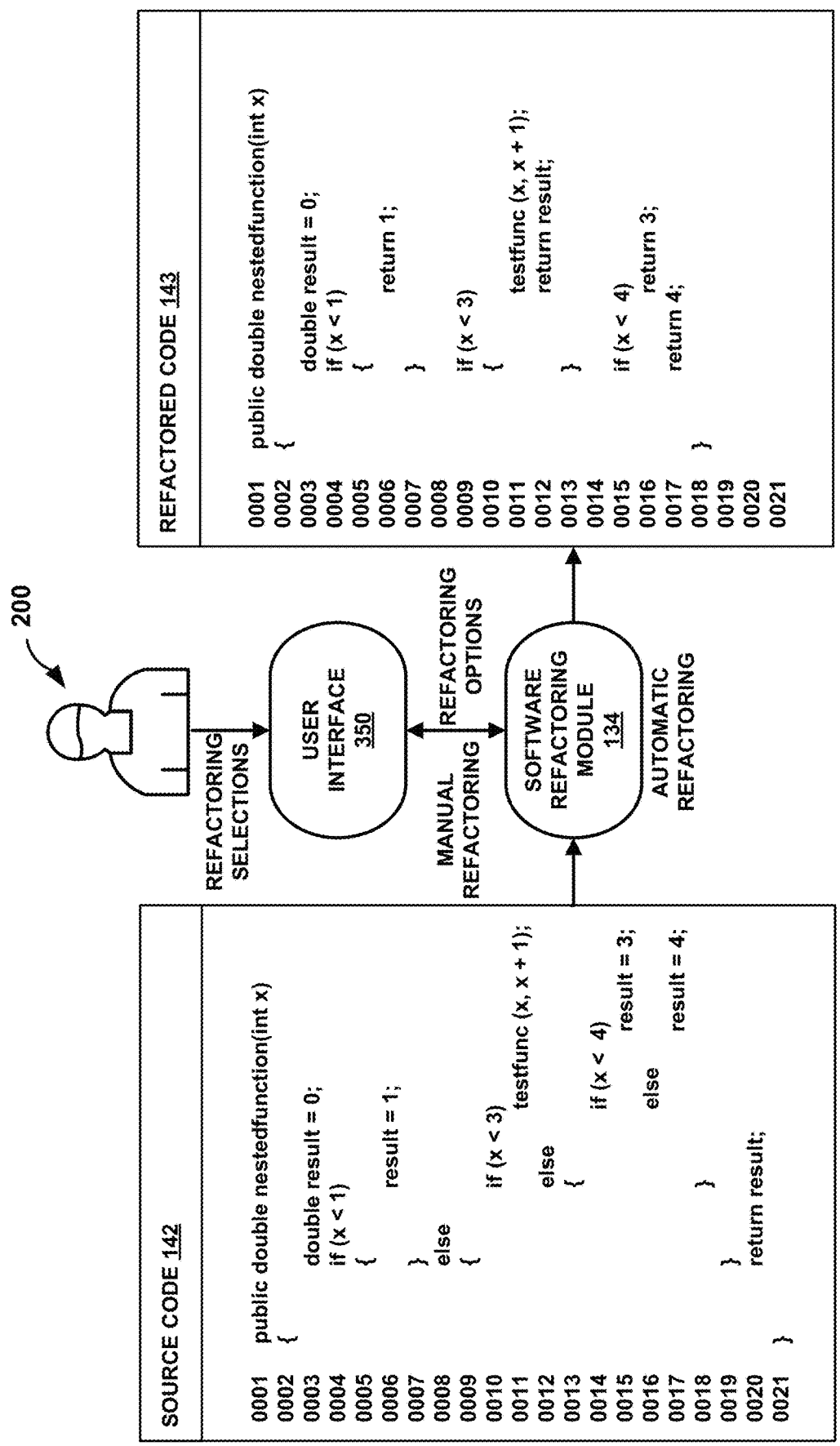
FIG. 5 is a conceptual diagram showing an example process of refactoring code according to examples of the disclosure.

FIG. 5 is a conceptual diagram showing an example process of refactoring code according to examples of the disclosure. In the example of FIG. 5, software refactoring module 134 may receive source code 142 as an input. In some examples, as is discussed above, software refactoring module 134 may perform automatic refactoring of source code 142, based on code violations identified by software refactoring module 134, to produce refactored code 143.

In other examples, software refactoring module 134 may display both source code 142, as well as refactoring options, to a user 200 via user interface 350. User 200 may then make refactoring selections, based on the refactoring options, through user interface 350. Based on these selections, software refactoring module 134 may affect manual refactoring of source code 142 to produce refactored code 143. In the example of FIG. 5, a nested if/else statement is removed from source code 142.

Figure 6:
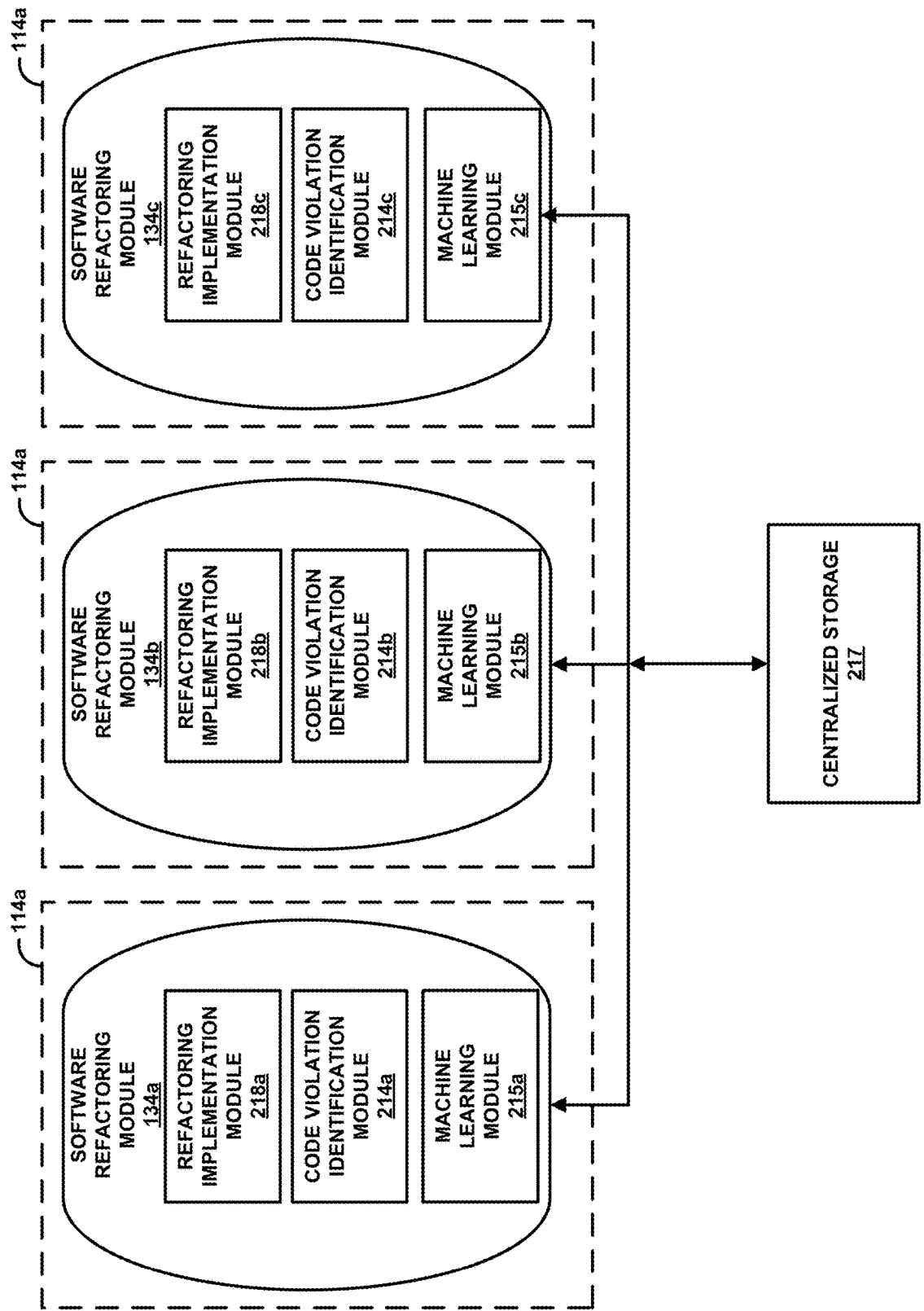
FIG. 6 is a block diagram showing an example system of the disclosure using machine learning techniques.

FIG. 6 is a block diagram showing an example system of the disclosure using machine learning techniques. In some examples, software refactoring module 134 may be further configured to perform machine learning techniques to improve one or more of code violation identification and/or automatic refactoring techniques. For example, using machine learning, software refactoring module 134 may gather and analyze user selections of refactoring options for certain identified code violations.

In the example of FIG. 6, a first processor 114a may be configured with a software refactoring module 134a. Software refactoring module 134 may include refactoring implementation module 218a and code identification module 214a. Refactoring implementation module 218a and code identification module 214a may be configured to operate in substantially the same manner as refactoring implementation module 218 and code identification module 214 described above. Software refactoring module 134a may further include machine learning module 215a. Machine learning module 215a may be configured to gather and analyze user selections of refactoring options when performing manual refactoring according to the techniques described above.

In some examples, machine learning module 215a may be configured to modify the function of code identification module 214a based on user selections of refactoring options. For example, if user 200 consistently selects "do nothing" for certain types of code violations identified by code violation identification module 214a, machine learning module 215a may instruct and/or modify code identification module 214a such that those certain types of code violations are no longer identified.

In other examples, machine learning module 215a may be configured to modify the function of refactoring implementation module 218a based on user selections of refactoring options. For example, if user 200 consistently selects a particular one or multiple refactoring options for certain types of code violations identified by code violation identification module 214a, machine learning module 215a may instruct and/or modify code refactoring implementation module 218a such that those certain types of code violations may be automatically refactored instead of refactored in response to user input.

Machine learning module 215a may be configured to employ any type of machine learning techniques in order to improve the performance of software refactoring module 134a when performing code violation identification and automatic refactoring. For example, machine learning module 215a may be configured to use one or more of decision tree learning, association rule learning, learning via artificial neural networks, inductive logic programming, support vector machines, clustering, Bayesian networks, reinforcement learning, representation learning, similarity and metric learning, sparse dictionary learning, genetic algorithms, and/or rule-based machine learning.

As shown in FIG. 6, the machine-learning techniques are not limited to one implementation of software refactoring module 134a. An enterprise may employ multiple devices to perform the techniques of software refactoring module 134a. For example, an enterprise may include processors 114a-c that, respectively, execute software refactoring modules a-c. Software refactoring modules a-c may be configured to share the analysis of their respective machine learning modules 215a-c so that a bigger data set of input may be used to improve the performance of software refactoring modules a-c. In some examples, the data gathered by machine learning modules 215a-c may be shared directly with each other. In other examples, the data gathered by machine learning modules 215a-c may be sent to centralized storage 217, that is accessible by each of processors 114a-c.

In some examples, during a machine learning process, software refactoring modules 134a-c may be configured to disallow the transmission of any of source code 142 outside of computing device 110. That is, while training data may be shared, source code 142 is not, thus protecting potentially proprietary data. Instead, software refactoring modules 134a-c may be configured to transfer metadata and/or markers or behaviors of the user, etc. to each other and/or centralized storage 217, and not the source code itself.

Figure 7:
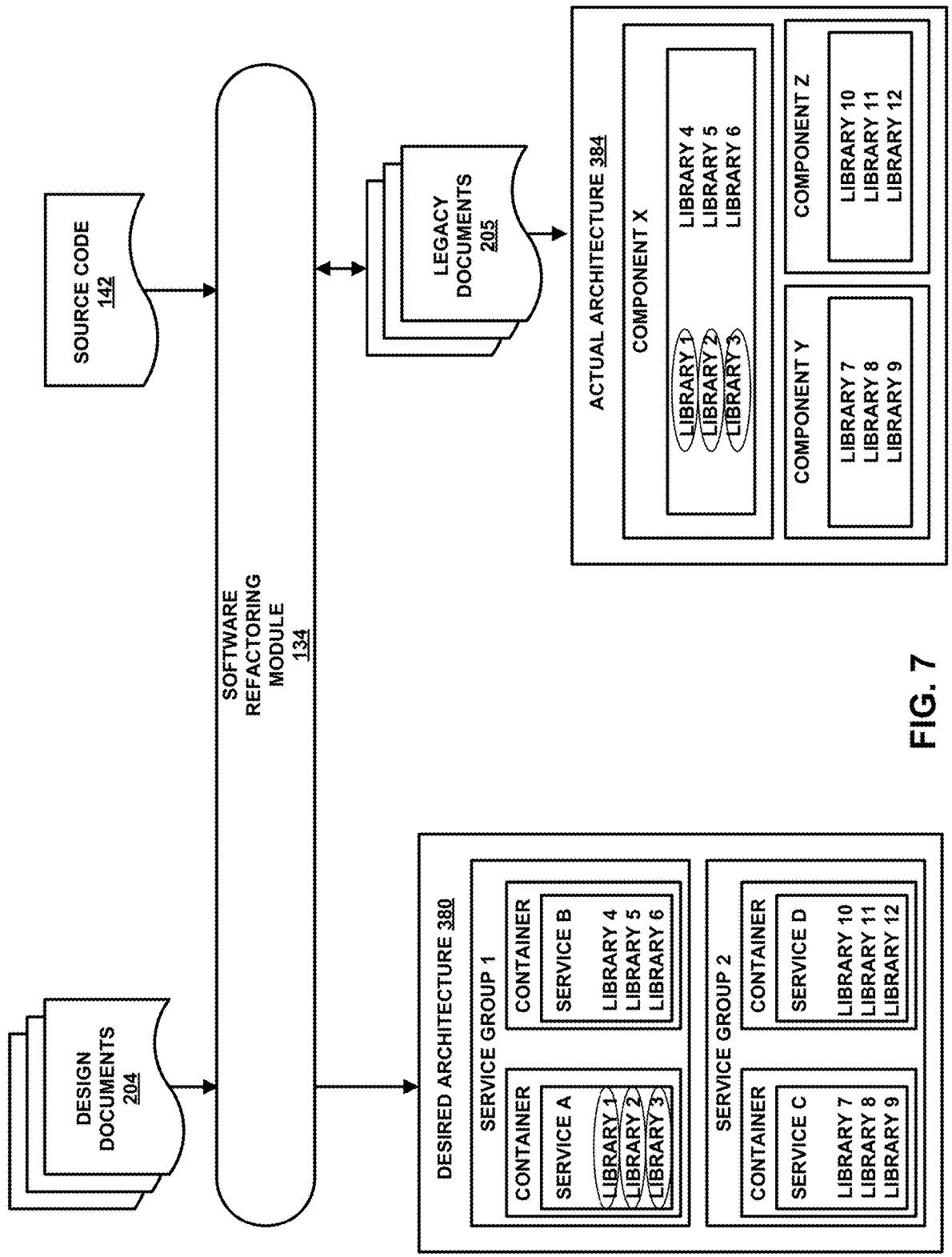
FIG. 7 is a conceptual diagram showing software refactoring for a migration from a component-based architecture to a service-oriented architecture according to example techniques of this disclosure.

FIG. 7 is a conceptual diagram showing software refactoring for a migration from a component-based architecture to a service-oriented architecture according to example techniques of this disclosure. In the example of FIG. 7, software refactoring module 134 may be configured to identify code violations and/or other issues in source code 142 that may be addressed when migrating source code 142 from one architecture type (e.g., a component-based architecture) to another architecture type (e.g., a service-oriented architecture). FIG. 7 shows an example of how software refactoring module may compare an actual architecture 384 of source code 142 to a desired architecture 380 (e.g., a service-oriented architecture).

Software refactoring module 134 read in design documents 204 that describe desired architecture 380. In this example, desired architecture 380 is a service-oriented architecture with two groups (service group 1 and service group 2), each containing two services. Service group 1 includes service A and service B and service group 2 includes service C and service D. Each of the services are in separate containers.

Software refactoring module 134 may be further configured to analyze source code 142 (e.g., a legacy application) to generate an architecture representation of the actual system (i.e., actual architecture 384). To build this architecture, software refactoring module 134 may be configured to analyze visual studio documents (e.g., legacy documents 205) that describe the relationship of libraries and executables (e.g., config files, csproj files, sln files, etc.). Software refactoring module 134 may also be configured to analyze the directory structure of how the source code and libraries for source code 142 is stored. Users could also provide previous design documents that describe the actual architecture if they choose.

Once software refactoring module 134 has built architectural representations of the desired architecture 380 and actual architecture 384, software refactoring module 134 analyzes both architectures to locate where each library or executable is located in each architecture. In the example of FIG. 7, some of these types of matches are circled. That is, libraries 1-3 in component X of actual architecture 384 are desired to be in service A of service group 1 of desired architecture 380. Once software refactoring module 134 has determined where each library belongs in the desired architecture 380, then software refactoring module 134 can determine what steps to take to move the libraries of actual architecture 384 to desired architecture 380.

In the example of FIG. 7, software refactoring module 134 may determine to split up the libraries contained by component X into two services (A and B). Those two services each need their own container and then a larger "Service Group 1" to hold both services. Similarly, software refactoring module 134 may convert components Y and Z to services, generate containers for each of those services, and put the containers in a service Group 2.

This disclosure will now describe two general techniques to locate and resolve source code and architectural configurations that prevent migration to a service-oriented architecture (or some other arbitrary architecture type), though it should be understood that other techniques may be used. The techniques described above may be used to locate the larger architectural changes. In this case, the creation of containers, creation of service groups, and migration to services over components. The first two of these changes may involve few changes to source code 142. This refactoring involves generating new architectural structures, which in some cases involves creating actual VS objects (projects, interfaces, etc.), but in most cases will involve making changes to the configuration files behind the VS source code. Wherever possible, software refactoring module 134 may make these changes automatically. However, in cases where it is not preferable or not possible to automatically refactor (e.g., access denied, files missing, dependencies, etc.) software refactoring module 134 may indicate to the user which changes may be made in the actual architecture 384 and walk the user through the process.

While many architectural changes can be made without source code 142, there are also some changes that will need to be made to source code 142 itself. In one example, software refactoring module 134 searches through source code 142 to find calls to external libraries. Then, software refactoring module 134 consults a configuration file to determine whether the library called belongs to the service that source code 142 will eventually belong to in the desired architecture. In one example, a user may select the libraries that are in the same service. In other examples, software refactoring module 134 may use design documents 204 to generate a configuration file listing the libraries in the current service. If software refactoring module 134 finds that the library being invoked is not part of the current service and does not use an interface to handle the call, then software refactoring module 134 may flag that library invocation as an improperly encapsulated call to an external service. This identification may be done without the desired design documents and/or with minimal help from the user. In order to accomplish this, software refactoring module 134 may not need access to the full architecture but may use a list of libraries that belong to the same service.

There are other service-oriented architecture code violations that appear in source code 142 that software refactoring module 134 can provide identification and refactoring for. Examples may include service abstraction, service autonomy, and service reusability Service abstraction refers to services that act as black boxes where their inner logic is hidden. Software refactoring module 134 may be configured to identify areas within potential services that are "public," meaning their logic is not hidden to external services and work to generate interfaces and properly abstract classes Service autonomy refers to services that are independent and control the functionality they encapsulate. Software refactoring module 134 may be configured to identify services that are too interdependent and suggest fixes to the user, whether it means merging two services that are frequently interacting, finding the common part of the services that are frequently interacting and separating those parts to its own service, determining the necessity of this interaction and providing alternatives for performing those functions independently without changing the configuration of services, etc.

Service reusability refers to logic that is divided into various services to promote reuse of code. Software refactoring module 134 may be configured to identify source code that is repeated or near-repeated across classes, functions, libraries, and services. Software refactoring module 134 may generate a separate function, class, library, or service to contain this repeated code and then reference that new code each time the repeated code is used.

Each of these features may be identified and possibly refactored even without a full desired architecture design. However, the more information and documents the user can provide, the more likely it is that the refactoring will be able to be automated.

Figure 8:
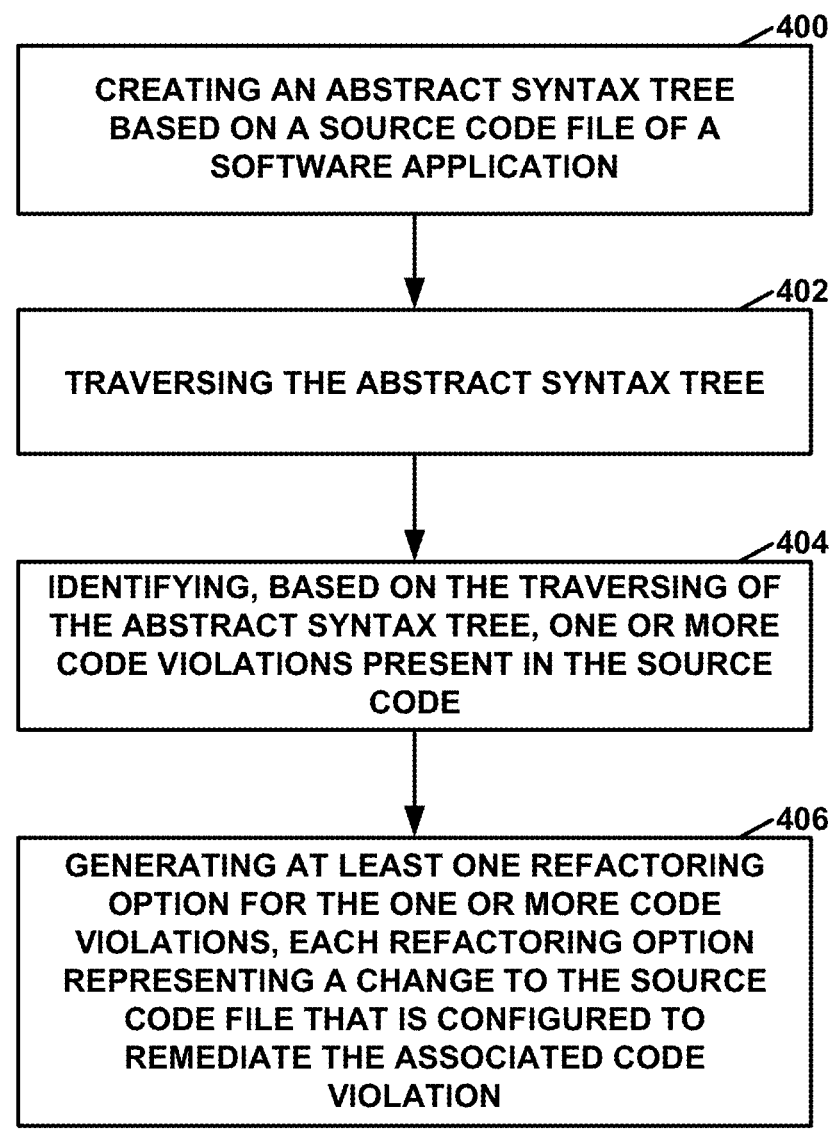
FIG. 8 is a flow diagram illustrating an example method for software refactoring in accordance with one or more aspects of this disclosure.

FIG. 8 is a flow diagram illustrating an example method for software refactoring, in accordance with one or more aspects of this disclosure. The techniques of FIG. 8 may be performed by one or more processors of a computing device, such as computing device 110 illustrated in FIG. 1. For purposes of illustration only, the techniques of FIG. 8 are described within the context of computing device 110 of FIG. 1 and the example process for software refactoring of FIG. 2, although computing devices having configurations different than that of computing device 110 may perform the techniques of FIG. 8.

In accordance with the techniques of this disclosure, one or more processors 114 of computing device 110 may create an abstract syntax tree based on a source code file of a software application, the source code file including source code defining operations of the software application (400). Code violation identification module 214 traverses the abstract syntax tree (402). Code violation identification module 214 identifies, based on the traversing of the abstract syntax tree, one or more code violations present in the source code. Code violation identification module 214 generates at least one refactoring option for the one or more code violations, each refactoring option of the at least one refactoring option representing a change to the source code file that is configured to remediate the associated code violation.

In some examples, code violation identification module 214 automatically performs one or more changes to the source code based on the at least one refactoring option. In some examples, code violation identification module 214 displays the one or more code violations and the associated at least one refactoring option for at least one code violation to a user, and refactoring implementation module 218 receives an indication of a selection, by the user, of a first refactoring option of the at least one refactoring option associated with a first code violation and changes the source code file based on the first refactoring option. In some examples, traversing the abstract syntax tree includes counting a total number of significant nodes within a code block during the traversing, wherein a significant node represents a significant line of source code, wherein identifying one or more code violations further includes determining that the total number of significant nodes within the code block exceeds a pre-determined threshold.

In some examples, generating at least one refactoring option further includes identifying a contiguous set of nodes that may be moved from an original code block to a separate code block, creating the separate code block within the source code file, copying lines of source code associated with the contiguous block of nodes into the separate code block, and replacing the lines of source code in the original code block with a call to the separate code block. In some examples, traversing the abstract syntax tree further includes determining, for each node of the abstract syntax tree, whether the node is a candidate to be moved out of the code block.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium may include a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A computer-implemented method comprising:
   identifying, by one or more computing devices and based on traversing an abstract syntax tree, code violations present in source code;
   generating, by the one or more computing devices, refactoring options for the code violations, each refactoring option representing a change to the source code that is configured to remediate an associated code violation;
   receiving indications, from users, of selected refactoring options associated with particular code violations;
   analyzing the selected refactoring options using machine learning;
   identifying, by the one or more computing devices and based on traversing the abstract syntax tree, code violations present in additional source code; and
   generating updated refactoring options for the identified code violations in the additional source code based on the analysis of the selected refactoring options.

2. The computer-implemented method of claim 1, wherein the one or more computing devices comprise a plurality of computing devices in an enterprise network.

3. The computer-implemented method of claim 1, further comprising:
   automatically performing, by the one or more computing devices, one or more changes to the additional source code based on the updated refactoring options.

4. The computer-implemented method of claim 1, wherein analyzing the selected refactoring options using machine learning comprises:
   analyzing the selected refactoring options using one or more of decision tree learning, association rule learning, learning via artificial neural networks, inductive logic programming, support vector machines, clustering, Bayesian networks, reinforcement learning, representation learning, similarity and metric learning, sparse dictionary learning, genetic algorithms, or rule-based machine learning.

5. The computer-implemented method of claim 1, further comprising:
   displaying a segment of the additional source code including the identified code violations present in the additional source code and the updated refactoring options;
   receiving an indication of a selection of a first refactoring option of the updated refactoring options; and
   changing the additional source code based on the first refactoring option.

6. The computer-implemented method of claim 1, further comprising:
   traversing the abstract syntax tree and counting a total number of significant nodes within a code block during the traversing, wherein a significant node represents a significant line of source code, and wherein identifying the code violations further includes determining that the total number of significant nodes within the code block exceeds a pre-determined threshold.

7. The computer-implemented method of claim 1, further comprising:
   disallowing transmission of the source code between computing devices of the one or more computing devices.

8. A device comprising:
   a memory configured to store source code; and
   one or more processors in communication with the memory, the one or more processors configured to:
      identify, based on traversing an abstract syntax tree, code violations present in the source code;
      generate refactoring options for the code violations, each refactoring option representing a change to the source code that is configured to remediate an associated code violation;

receive indications, from a user, of selected refactoring options associated with particular code violations;

analyze the selected refactoring options using machine learning;

identify, based on traversing the abstract syntax tree, code violations present in additional source code; and generate updated refactoring options for the identified code violations in the additional source code based on the analysis of the selected refactoring options.

9. The device of claim 8, wherein the one or more processors are further configured to:

automatically perform one or more changes to the additional source code based on the updated refactoring options.

10. The device of claim 8, wherein to analyze the selected refactoring options using machine learning, the one or more processors are further configured to:

analyze the selected refactoring options using one or more of decision tree learning, association rule learning, learning via artificial neural networks, inductive logic programming, support vector machines, clustering, Bayesian networks, reinforcement learning, representation learning, similarity and metric learning, sparse dictionary learning, genetic algorithms, or rule-based machine learning.

11. The device of claim 8, wherein the one or more processors are further configured to:

display a segment of the additional source code including the identified code violations present in the additional source code and the updated refactoring options;

receive an indication of a selection of a first refactoring option of the updated refactoring options; and change the additional source code based on the first refactoring option.

12. The device of claim 8, wherein the one or more processors are further configured to:

traverse the abstract syntax tree and count a total number of significant nodes within a code block during the traversing, wherein a significant node represents a significant line of source code, and wherein to identify the code violations, the one or more processors are further configured to determine that the total number of significant nodes within the code block exceeds a pre-determined threshold.

13. The device of claim 8, wherein the one or more processors are further configured to:

disallow transmission of the source code to another computing device.

14. A non-transitory computer-readable storage medium storing instructions that, when executed, cause one or more processors to:

identify, based on traversing of abstract syntax tree, code violations present in source code;

generate refactoring options for the code violations, each refactoring option representing a change to the source code that is configured to remediate an associated code violation;

receive indications, from a user, of selected refactoring options associated with particular code violations;

analyze the selected refactoring options using machine learning;

subsequently identify, based on traversing the abstract syntax tree, code violations present in additional source code; and generate updated refactoring options for the identified code violations in the additional source code based on the analysis of the selected refactoring options.

15. The non-transitory computer-readable storage medium of claim 14, wherein the instructions further cause the one or more processors to:

automatically perform one or more changes to the additional source code based on the updated refactoring options.

16. The non-transitory computer-readable storage medium of claim 14, wherein to analyze the selected refactoring options using machine learning, the instructions further cause the one or more processors to:

analyze the selected refactoring options using one or more of decision tree learning, association rule learning, learning via artificial neural networks, inductive logic programming, support vector machines, clustering, Bayesian networks, reinforcement learning, representation learning, similarity and metric learning, sparse dictionary learning, genetic algorithms, or rule-based machine learning.

17. The non-transitory computer-readable storage medium of claim 14, wherein the instructions further cause the one or more processors to:

display a segment of the additional source code including the identified code violations present in the additional source code and the updated refactoring options;

receive an indication of a selection of a first refactoring option of the updated refactoring options; and change the additional source code based on the first refactoring option.

18. The non-transitory computer-readable storage medium of claim 14, wherein the instructions further cause the one or more processors to:

traverse the abstract syntax tree and count a total number of significant nodes within a code block during the traversing, wherein a significant node represents a significant line of source code, and wherein to identify the code violations, the one or more processors are further configured to determine that the total number of significant nodes within the code block exceeds a pre-determined threshold.

19. The non-transitory computer-readable storage medium of claim 14, wherein the instructions further cause the one or more processors to:

disallow transmission of the source code to another computing device.

* * * * *